April 12, 1960
E. E. PRANCE ET AL
2,932,127
ROTARY HACK AND SPRAYER
Filed Feb. 29, 1956
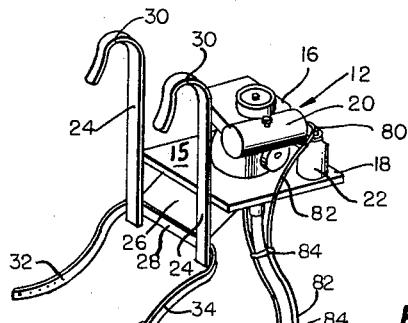
FIG. 1.
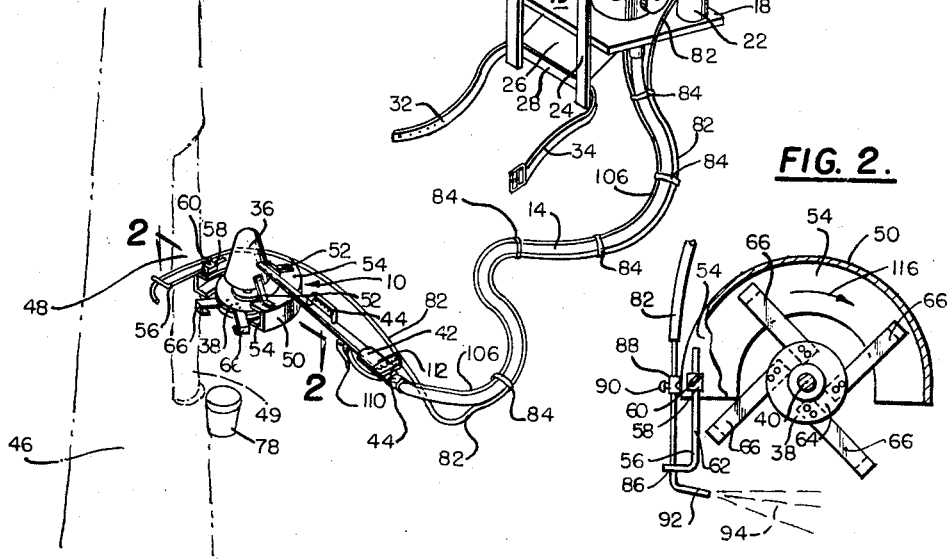
FIG. 2.
FIG. 3.
FIG. 4.
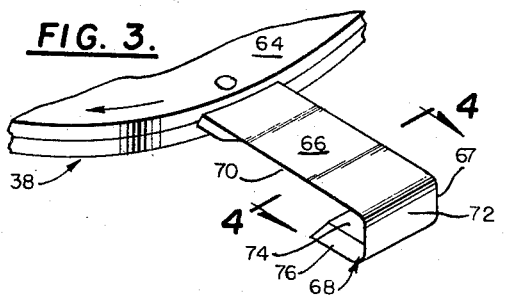
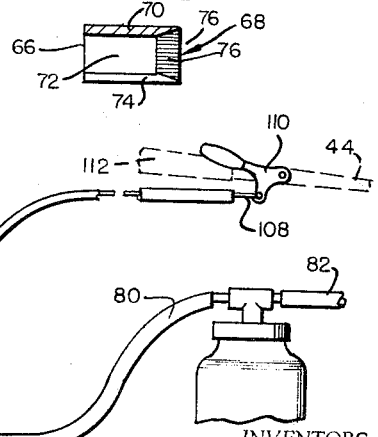
FIG. 5.
INVENTORS
EDGAR E. PRANCE
JOHN E. SHEFFIELD
BY Munn, Liddy, Nathanson & Marsh
ATTORNEYS

United States Patent Office 2,932,127
Patented Apr. 12, 1960

2,932,127
ROTARY HACK AND SPRAYER

Edgar E. Prance, Columbus, and John E. Sheffield, Quitman, Ga.

Application February 29, 1956, Serial No. 568,491

13 Claims. (Cl. 47—12)

The present invention relates to improvements in tree hacks utilized for the treatment of appropriate types of trees for the procurement of forest products therefrom and more particularly to a power-operated hacking tool for this purpose.

The exemplary application of the invention discussed herein is intended for illustrative purposes only and is not to be taken as limitative of the invention.

In the treatment of turpentine pine trees for the extraction of raw gum from which naval stores are subsequently refined a sap-exuding face is provided on the trunk of the tree, which face is composed of a series of streaks or cuts each added periodically as the flow from the previous streak ceases. The streaks terminate in a channel for conducting the sap or gum to a suitable receptacle. For increasing and prolonging the flow of gum-bearing sap from the face, each streak as it is made is sprayed with a strong mineral acid, for example sulphuric acid.

Heretofore it has been the practice to cut the aforedescribed streaks with a hand tool or hack and to subsequently spray the streak with acid, as by utilizing lung-powered spraying apparatus. Such hand operations have been time-consuming, individually and collectively, and therefore expensive since the number of faces that can be tended by one operator in a two- or three-weeks period is seriously limited. Moreover, when utilizing a hand tool it has been difficult to judge precisely the depth of cut required for optimum gum-flowing characteristics. In cutting the successive streaks imparted to the face, the cuts must be of the same depth relative to the tree trunk, in order that a relatively deeper cut will not impede the flow of gum to a successive, shallower cut. To preserve the value of the trunk for subsequent use as lumber it is likewise important that the streaks be carefully controlled as to depth.

Power-operated hacking machines have been proposed from time to time, but such machines have been cumbersome to operate or have otherwise lacked the complete portability essential in order to enable an operator to cover a comparatively large stand of timber. Such machines have suffered from the further disadvantage that the depth of cut is not readily controllable, particularly with reference to each portion of the arcuate surface of the face imparted to the trunk. The cutting blades of known machines heretofore have been provided with a configuration such that the chips produced by the cutting or streaking operation were not completely hurled away from the cutter, thereby causing the blades to clog or gum-up. In the case of streaking pine trees to obtain gum from which naval stores are produced, the incomplete removal of chips occurring in the use of power-driven hacks or chippers, or in the use of the aforesaid hand-operated tools, resulted in clogging, required covering of the gum receptacles to prevent chips from falling therein, and brushing of the sap-exuding face to remove chips therefrom which otherwise would be carried into the gum-collecting receptacle. Such clogging, and covering and brushing operations wasted considerable operator time. In those machines having acid-spraying mechanism combined therewith, no means have been provided heretofore for accurately and adjustably controlling the amount of acid applied to the streak.

Accordingly an object of the present invention is the provision of a novel and efficient power-operated tree hack.

Another object of the invention is the provision of a power-operated tree chipping and spraying machine, wherein the spray can be adjustably and accurately controlled by the operator thereof.

A further object of the invention is the provision of a power-operated chipper or gouging machine wherein the depth of cut made by the machine is readily and adjustably controlled.

Still another object of the invention is the provision of a tree hack having an efficient blade arrangement adapted for completely removing the chips produced during the cutting operation.

Yet another object of the invention is the provision of a power-operated chipping tool adapted for removing only the bark from the face of the cut, thereby prolonging the life of the tree and increasing its ultimate value as lumber.

A still further object of the invention is the provision of a power-operated tree chipping and spraying mechanism which is light in weight and readily portable.

Additional objects, features, and advantages of the invention will be made apparent in the forthcoming description of embodiments thereof, said description to be taken in conjunction with the accompanying drawings wherein:

Fig. 1 is a perspective view of one illustrative form of the invention constructed in accordance with the principles herein set forth.

Fig. 2 is an enlarged horizontal sectional view taken along reference line 2—2 of Fig. 1, parts having been broken away for clarity.

Fig. 3 is an enlarged perspective view of a portion of the cutter 38 of Fig. 2.

Fig. 4 is a sectional view taken along reference line 4—4 of Fig. 3, and,

Fig. 5 is a side elevational view of one arrangement for controlling the streak or cut spraying mechanism, parts having been broken away for clarity.

In the drawings similar reference characters refer to similar parts.

Referring now more particularly to Figs. 1 and 2 of the drawings, the illustrative form of the invention depicted therein comprises the cutting or hacking extension 10 and the portable power unit 12. Power is transmitted to the hacking extension 10 by means of the flexible shafting 14 connected thereto and to the drive shaft of a prime mover, for an example, the gasoline or other internal combustion engine 16 forming part of the portable unit 12. Obviously, any portable source of mechanical power can be utilized; however, an engine of the character described is preferred in view of its portability and for additional reasons presently to be described.

The portable power unit 12 is adapted to be carried on the back of the operator of the tree hacking machine and comprises a mounting platform 15 upon which are mounted the gasoline engine 16 and fuel tank 20, and a liquid container 22. A suitable aperture (not shown) is formed in the platform 18 through which an end of the flexible shafting 14 is inserted and connected to the drive shaft of the engine 16. The flexible shafting is that usually employed in driving power tools. Platform 18 is secured to a pair of upstanding shoulder supports 24 and supported in perpendicular relationship thereto by means of the bracing member 26. The shoulder supports 24 are maintained in parallelism by the crossbrace 28 and terminate in hooks 30 shaped to engage the shoulders of the operator. Hooks 30 are preferably provided with padding (not shown) for the comfort of the operator. In order to stabilize the power unit 12 while in position upon the back of the operator, the belts 32 and 34, each having one end thereof affixed respectively to the supports 24, are provided for securing the unit 12 about the waist of the operator.

The cutting extension 10 is connected to the power unit 12 by means of the flexible shafting 14, as aforesaid, the shafting being of such length as to lend maneuverability to the cutting extension 10. The cutting extension includes a gearing train mounted therein for transferring the torque imparted to the shafting 14 to the rotary cutter 38 through the stub shaft 40 affixed thereto. The details of the aforementioned gearing arrangement are well understood and accordingly a more detailed description is dispensed with. The exterior sheath of the flexible shafting 14 is connected to handle 42 mounted on the housing 36. Handle 42 is sufficient for guiding the extension 10 relative to the arcuate contour of the trunk 46 when hacking, a streak 48. The handle 42 is preferably of sufficient length to extend the flexible shafting 14 clear of the tree. Operator hand grips 44 are provided to facilitate use of the hack.

In order to protect the operator of the hack from flying chips and from coming into accidental contact with the rotary cutter 38, an annularly shaped guard 50 is suspended from the gearing housing 36 via the brackets 52, or, alternatively, may be formed integrally with said housing. The guard 50 is arranged with flanges 54 such that those parts of the cutter extending toward the operator are partially enclosed. The various openings in the guard 50 admit of ready accessibility to the cutter 38 and associated shaft 40 for sharpening and other repairs.

For accurately controlling the depth of cut to be made by the cutter 38, a depth gauge is conveniently mounted upon the guard 50. One form of such gauge includes an L-shaped rod 56 having the longer leg thereof adjustably mounted on the flange 54 of the guard 52 by means of a bracket 58 and thumbscrew 60, as better shown in Fig. 2. The shorter leg of the rod 56, preferably extending away from the direction of cutting movement of the extension 10 relative to the trunk 46, is arranged to contact the surface of the trunk when the proper depth of cut has been obtained. If desired, a graduated scale 62 may be enscribed upon the longer leg of the rod 56 to aid in setting the same for the proper depth of cut. In cutting the sap-exuding faces in the conventional manner, that is to say, by adding streaks progressively upwards of the trunk, the rod 56 is arranged to contact the circumference of the trunk at a point above the cutter 38. In order to provide more positive control over the depth of the streak 48 being cut an identical gauge can likewise be mounted on the guard 50 to the right of the cutter 38 (Fig. 2), in addition to the gauge shown in the drawings. With the aforedescribed gauging arrangement and with the cutter blades presently to be described a face of uniform depth can be imparted to the trunk, thereby securing uniform flow of gum from streak to streak and preserving the value of the trunk as lumber, as well as prolonging the period in which gum-bearing sap can profitably be extracted from the tree.

Referring now to Figs. 2, 3 and 4, there is shown therein an illustrative form of the rotary cutter 38 particularly adapted for imparting a smooth face 49 to the trunk 46. The cutter 38 comprises a disk 64 affixed to the shaft 40 and a plurality of cutting blades 66, chordally attached to the disk 64 for the purpose of furnishing the maximum support to the blades, and of enabling the heel 67 of the blades 66 to aid in collecting and carrying chips formed in the cutting operation away from the streak 48. It has been found that four such cutting blades 66 minimize the fatiguing vibrations of the cutting operation without unduly increasing the cost of the cutter 38. As better shown in Fig. 3, each of the cutting blades 66 is provided with squared-off cutting edges 68, as it were, such that the cutter 38 is thereby adapted to cut streaks having a flat circumferential bottom wall and to cut a resultant face having uniform depth and a smooth surface. The cutting edges 68 of each blade 66 are formed along substantially the entire length thereof consisting of the leg 70, the upright portion 72 and the turned-inward member 74. Obviously the relative proportions of the members 70, 72, and 74 can be changed to correspond with the width and depth of cut desired. The edges 68 are ground in a manner that a relatively pronounced bevel 76 (Fig. 4) extends contiguously to each of the cutting edges 68. The purpose of the bevels, particularly that formed on the turned-inward member 74, is to impinge upon the chips as they are formed in the cutting or streaking operation and to deflect them outwardly and away from the tree trunk face 49. Thus, wood particles are prevented from contacting and adhering to the face 49. Otherwise brushing would be necessary to remove the chips and prevent their being carried into the gum receptacle 78 (Fig. 1) as the gum flows from the newly added streak.

As pointed out heretofore, chemical stimulation of the streak is desirable to increase and prolong the flow of gum therefrom. Thus with chemical treatment, which usually takes the form of spraying the streak with sulphuric acid, it has been found that the same amount of naval stores can be extracted from a crop of trees by streaking the trees only half as often as in the case of untreated trees. Such chemical stimulation is beneficial in either the wood-chipping or bark chipping methods of streaking. Although in the latter case the use of acid-treatment is necessary to effectively initiate the flow of gum, the yields from the respective methods are approximately the same when employing chemical treatment.

Figs. 1, 2 and 5 illustrate one arrangement for effectively and efficiently spraying the streak 48 simultaneously with the cutting thereof thereby eliminating operator-time consumed by the conventional hand-spraying operations. Mounted on the portable power unit 12 is a container 22 adapted to store a supply of liquid material, such as sulphuric acid, to be utilized in the process of chemically stimulating the streak 48. The container is equipped with flexible conduits 80 and 82, which are respectively arranged to supply air pressure to the container 22 and to conduct liquid therefrom. The details of the aforementioned arrangement are well-known and accordingly further description is deemed unnecessary. The liquid conduit 82 is secured to the flexible shafting 14 by means of the straps or bands 84 disposed at intervals along the length thereof and terminates in the spray-nozzle 86.

As more clearly shown in Fig. 2, the nozzle 86 is movably mounted on the guard 50 by means of the bracket 88 and is adjustably secured in one of a plurality of positions relative to the cutting blades 66, via the thumbscrew 90. A scale (not shown) can be enscribed on the nozzle 86 adjacent the bracket 88 to aid in adjusting the nozzle. Obviously a certain amount of play must be left in the conduit 82 to permit the aforesaid adjustment. The tip 92 of the spray nozzle 86 is inclined outwardly such that the chemical spray 94 issuing therefrom is directed into those portions of the streak 48 immediately following the area in streaking contact with the cutting blades 66.

The pneumatic pressure necessary for the operation of the illustrated spraying mechanism is efficiently and inexpensively supplied to the container 22 by coupling the latter to the exhaust manifold 96 (Fig. 5) of the gasoline engine 16. Obviously an independent source of fluid pressure can be utilized, for an example, a valved cylinder of compressed air or gas, and the like; or alternatively, a small centrifugal compressor operated by the gasoline engine or other driving means can be arranged to supply pressure to the container 22. The conduit 80 is connected to a relatively fluid-tight valve-box 98 shown in sectionalized outline at Fig. 5 and mounted upon the exhaust manifold 96. An aperture 100 is formed in the manifold 96 for emitting exhaust gases to the valve-box 98 and to the conduit 80. The quantity of gases issuing from the aperture 100, and the resultant pressure supplied to the container 22 is adjustably controlled or shut off altogether by means of a valve comprising the pivotally mounted valve gate 102, arranged to adjustably constrict the aperture 100 and the spring 104 connected to bias the gate 102 to the closed position relative to the aforesaid aperture. The term "adjustably constrict" is to be taken to include the completely closed position. The valve gate 102 is opened against the action of the spring 104 through actuation of the flexible cable 106, the core 108 of which (Fig. 5) is connected at one end to the gate 102 and at the other to the valve operating lever 110 conveniently mounted adjacent the handgrip 112 of the handle 44 (Fig. 1). To preserve the fluid-tight character of the valve-box 98, suitable packing material 114 is disposed in the aperture whereat the core 108 enters the valve-box. Alternatively, the aforedescribed valve can be replaced by suitable valve means (not shown) connected in either one of the conduits 80 or 82 and operated by the flexible cable 106.

With the arrangement disclosed herein, selective manipulation of the lever 110 during the cutting or streaking operation permits the proper quantity of acid or other liquid material to be sprayed into the newly cut streak. Inasmuch as the spraying mechanism is subject to the control of the operator, excessive waste of acid is prevented and danger to the operator from accidentally contacting the acid is minimized.

In operation the handgrips 44 of the cutting extension 10 are grasped, respectively, in the operator's right and left hands. With the cutter 38 rotating in the direction indicated by the arrow 116 (Fig. 2) the extension is moved from right to left with the operator standing on the right hand side and to the rear of the housing 36 and guide 50, the side opposite to the side having the rod 56 in Figure 1 during the streaking operation. The rod 56 having been adjusted to the depth of cut desired, the extension 10 is moved with such speed that the shorter leg of the rod 56 maintains contact with the uncut portion of the trunk 46 as the extension 10 is moved thereover. At the same time the operator selectively manipulates the valve lever 110 thereby causing a controlled amount of acid or other chemical treating liquid to be sprayed into the cut. Spraying and cutting are done on the same stroke.

In the foregoing discussion, it has been made apparent that the novel and efficient tree-hacking machine disclosed herein has been described in connection with the procurement of naval stores for illustrative purposes only. Obviously the machine can be adapted for other purposes, and while a preferred embodiment is disclosed many changes in details and form can be made within the scope of the appended claims.

We claim:

1. A portable tree streaking and spraying machine comprising a driving means; a valved fluent material spraying means; means for securing said driving means and said spraying means to the body of an operator; a cutting extension comprising a housing having a rotary cutter mounted for turning movement therein, said housing partially surrounding said cutter; a spray-nozzle mounted on said housing, said nozzle being arranged to direct said fluent material into said streak as it is being cut; a flexible conduit connecting said nozzle to said spraying means; controlling means mounted on said cutting extension and connected in controlling relationship to said valved spraying means; and means including flex- ible shafting for coupling said driving means to said cutter.

2. A portable tree streaking and spraying machine comprising a driving means; a valved fluent material spraying means; means for securing said driving means and said spraying means to the body of an operator; a cutting extension comprising a housing having a rotary cutter mounted for turning movement therein, said housing partially surrounding said cutter; a depth of cut gauging rod mounted on said housing and arranged to contact said tree at the desired depth of said streak; a spray-nozzle mounted on said housing, said nozzle being arranged to direct said fluent material into said streak as it is being cut; a flexible conduit connecting said nozzle to said spraying means; controlling means mounted on said cutting extension and connected in controlling relationship to said valved spraying means; and means including flexible shafting for coupling said driving means to said cutter.

3. A portable tree streaking and spraying machine comprising a driving means; a valved fluent material spraying means; means for securing said driving means and said spraying means to the body of an operator; a cutting extension comprising a housing having a rotary cutter mounted for turning movement therein, said housing partially surrounding said cutter; at least one depth of cut gauging rod adjustably mounted on said housing and arranged to contact said tree at the desired depth of said streak; a spray-nozzle adjustably mounted on said housing, said nozzle being arranged to direct said fluent material into said streak as it is being cut; scale indicia enscribed on said gauging rod and said nozzle, respectively; a flexible conduit connecting sad nozzle to said spraying means; controlling means mounted on said cutting extension and connected in controlling relationship to said valved spraying means; and means including flexible shafting for coupling said driving means to said cutter.

4. A portable tree-hacking and spraying machine comprising a source of mechanical torque; a container adapted to hold fluent material; valved means for supplying pneumatic pressure to said container; a support for securing said source, said container and said means to the body of an operator; a cutting extension including a rotary cutter, a housing partially surrounding said cutter, a shaft mounted for turning movement in said housing, said cutter being secured to said shaft, handles attached to said housing, a depth of cut gauging rod adjustably mounted on said housing and arranged to contact the surface of said tree at the desired depth of cut being made in said tree, a spray-nozzle mounted on said housing, said nozzle being arranged to direct said fluent material into said cut, and a lever mounted on one of said handles and having linkage connected in controlling relationship to said valved means; a flexible conduit connecting said container and said nozzle; and means including flexible shafting arranged to transfer said torque from said source to said cutter shaft.

5. In a portable tree hacking and spraying machine, a support adapted to be secured to the body of an operator; an internal combustion engine mounted on said support; a container mounted on said support and adapted for holding fluent material; a cutting extension comprising a housing having a shaft rotatably mounted therein; a rotary cutter secured to said shaft, a portion of said shaft protruding from a cut-away portion of said housing; means including flexible shafting arranged to transmit torque developed by said engine to said shaft; a spray-nozzle mounted on said housing and arranged to direct said fluent material into a cut being made in said tree; a flexible conduit connecting said container and said nozzle; a second conduit arranged to supply pressure from the exhaust manifold of said engine to said container; valve means connected in one of said conduits; and a lever mounted on said cutting extension and having linkage connected in controlling relationship to said valve means.

6. In a portable tree streaking and spraying machine, an internal combustion engine; a container adapted for holding fluent material; means for securing said engine and said container to the body of an operator; a cutting extension comprising a housing having a shaft rotatably mounted therein; a rotary cutter secured to said shaft, said housing partially surrounding said cutter; flexible shafting connecting said engine and said cutter shaft; a spray-nozzle mounted on said housing and arranged to direct said material into said streak as it is being cut; a flexible conduit connecting said nozzle and said container; and valved means arranged to supply pressure from the exhaust manifold of said engine to said container.

7. A portable tree hacking and spraying machine comprising a support adapted to be secured to the body of an operator; an internal combustion engine mounted on said support; a container adapted to hold fluent material, said container being mounted on said support; a cutting extension including a rotary cutter, a housing partially surrounding said cutter, a shaft mounted for turning movement in said housing, said cutter being secured to said shaft, a handle attached to said housing, a depth of cut gauging rod adjustably mounted on said housing and arranged to contact the surface of said tree at the desired depth of cut being made therein, and a spray-nozzle mounted on said housing, said nozzle being arranged to direct said fluent material into said cut; means including flexible shafting arranged to transmit torque developed by said engine to said cutter shaft; a flexible conduit connecting said container and said nozzle; a second conduit arranged to supply pressure from the exhaust manifold of said engine to said container; valve means connected in one of said conduits; and a lever mounted on one of said handles and having linkage connected in controlling relationship to said valve means.

8. In a portable tree streaking and spraying machine, an internal combustion engine; a container adapted for holding fluent material; means for securing said engine and said container to the body of an operator; a cutting extension comprising a housing having a shaft rotatably mounted therein; a rotary cutter secured to said shaft, said housing partially surrounding said cutter; a depth of streak gauging rod adjustably mounted on said housing and arranged to contact said tree at the desired depth of said streak; a spray nozzle adjustably mounted on said housing, said nozzle being arranged to direct said material into said streak as it is being cut; a flexible conduit connecting said container and said nozzle; valved means arranged to supply pressure from the exhaust manifold of said engine to said container; a lever mounted on said cutting extension and having linkage connected in controlling relationship to said valved means; and flexible shafting connecting said engine and said cutter shaft.

9. In a portable tree streaking and spraying machine, an internal combustion engine; a container adapted for holding fluent material; means for securing said engine and said container to the body of an operator; a cutting extension comprising a housing having a rotary cutter mounted for turning movement therein, said housing partially surrounding said cutter; means including flexible shafting for coupling said engine to said cutter; a spray-nozzle mounted on said housing and arranged to direct said material into said streak as it is being cut; a flexible conduit connecting said nozzle to said container; and valved means arranged to supply pressure from the exhaust manifold of said engine to said container, said last-named means including a fluid-tight valve-box mounted on said manifold, an aperture formed in said manifold and opening into said box, a valve-gate pivotally mounted within said box and arranged for adjustably constricting movement relative to said aperture, a biasing spring connected to said valve-gate and biasing the same to the closed position relative to said aperture, a conduit connecting said box to said container, and a flexible cable having one end of the core thereof passing through a wall of said box and connected in controlling relationship to said valve-gate and having the other end thereof connected to a valve-operating lever mounted on said cutting extension.

10. A portable bark-stripping and trunk spraying machine comprising an internal combustion engine; a fluid pressure operated fluent material spraying mechanism; means for securing said engine and said spraying mechanism to the body of an operator; a cutting-extension including a housing having a rotary cutter mounted for turning movement therein, said housing partially surrounding said cutter, said cutter including a plurality of cutting blades each having a leg member adjoining an upright member in turn adjoining a turned-inward member and having cutting edges and beveled chip-deflecting portions contiguous thereto formed on each of said members, said upright member corresponding to the width of cut made by said machine; at least one depth of cut gauging rod adjustably mounted on said housing and arranged to contact an uncut portion of said bark at a depth of cut sufficient to remove said bark; a spray nozzle mounted on said housing and arranged to direct said material into said cut as it is being made; a flexible conduit connecting said nozzle to said spraying mechanism; valved means connected to the exhaust manifold of said engine and to said spraying mechanism for supplying pressure to said mechanism; controlling means mounted on said cutting extension and connected in controlling relationship to said valved means; and means including flexible shafting for coupling said engine to said cutter.

11. A portable tree hacking machine comprising a source of mechanical torque, means for securing said source to the body of an operator, a cutting extension including a rotary cutter, a housing partially surrounding said cutter, a shaft mounted for turning movement in said housing, said cutter being secured to said shaft, a handle attached to said housing, said handle extending radially outward with respect to said cutter, means including flexible shafting arranged to transfer torque from said source to said cutter shaft, said flexible shaft extending parallel to said handle along the length of the latter.

12. A portable bark-stripping machine comprising a source of power, means securing said source to the body of an operator, a cutting extension including a housing having a rotary cutter mounted in said housing for turning movement, said housing at least partially surrounding said cutter, said cutter including a plurality of cutting blades each having a leg member adjoining an upright member, said upright member in turn adjoining a member turned radially inward of said cutter parallel to said leg member, cutting edges formed on each of said members, the cutting edge on said upright member merging into the cutting edges of said leg and said turned inward member, said upright member being of a height corresponding to the width of the cut adapted to be made by said machine, means including flexible shafting for coupling said power source to said cutter.

13. A portable bark-stripping machine comprising a source of power, means securing said source to the body of an operator, a cutting extension including a housing having a rotary cutter mounted in said housing for turning movement, said housing at least partially surrounding said cutter, said cutter including a plurality of cutting blades each having a leg member adjoining an upright member, said upright member in turn adjoining a member turned radially inward of said cutter parallel to said leg member, cutting edges formed on each of said members, the cutting edge on said upright member merging into the cutting edges of said leg and said turned inward member, said upright member being of a height corresponding to the width of the cut adapted to be made by said machine, means including flexible shafting for coupling said source of power to said cutter, a depth of cut gaging rod adjustably mounted on said housing, said rod being adapted to contact the surface of a tree being cut by said cutter to assist in controlling the depth of cut, said gaging rod extending laterally of said shaft.

References Cited in the file of this patent

UNITED STATES PATENTS

| | | |
|---|---|---|
| 584,854 | Crane | June 22, 1897 |
| 809,444 | Ivey | Jan. 9, 1906 |
| 1,646,812 | Davey | Oct. 25, 1927 |
| 1,646,813 | Davey | Oct. 25, 1927 |
| 2,563,195 | Soule et al. | Aug. 7, 1951 |
| 2,592,900 | Hough | Apr. 15, 1952 |
| 2,792,670 | Haynes | May 21, 1957 |

OTHER REFERENCES

Publication: Ryberg, "Research in Equipment . . .," published August 1949 in Engineering Progress at the University of Florida, vol. 3, No. 6, pages 1 through 20, Technical Series No. 32. Only pages 13 and 14 are relied on.